United States Patent [19]
Ikuta

[11] Patent Number: 5,297,756
[45] Date of Patent: Mar. 29, 1994

[54] FISHING REEL WITH ADJUSTABLE DRAG FORCE CHARACTERISTICS

[75] Inventor: Takeshi Ikuta, Sakai, Japan
[73] Assignee: Shimano, Inc., Osaka, Japan
[21] Appl. No.: 754,669
[22] Filed: Sep. 4, 1991
[30] Foreign Application Priority Data
  Sep. 25, 1990 [JP] Japan .................. 2-100397[U]
[51] Int. Cl.$^5$ ............................. A01K 89/033
[52] U.S. Cl. ................... 242/270; 242/245; 242/255
[58] Field of Search ............... 242/244, 245, 246, 255, 242/264, 265, 266, 267, 268, 269, 270, 271, 302, 303, 304

[56] References Cited
U.S. PATENT DOCUMENTS
  2,067,067  1/1937  Shakespeare .......... 242/266
  4,702,430 10/1987  Saito ................. 242/245
  4,867,392  9/1989  Sato ................. 242/255

FOREIGN PATENT DOCUMENTS
  63-29423  8/1988  Japan .

Primary Examiner—Joseph J. Hail, III
Attorney, Agent, or Firm—Dickstein, Shapiro & Morin

[57] ABSTRACT

A fishing reel includes a drag mechanism adjustable by a drag controller, and a characteristics varying device for varying a drag increasing and decreasing rate relative to a unit operation of the drag controller. The characteristics varying device includes an adjusting dial for selecting drag variation characteristics. A turning force of the dial is transmitted through a worm gear to a movable disk having a plurality of projections. A plurality of cams are supported in a holder to be tiltable to varied degrees as a result of variations in positions of contact with the projections formed on the movable disk.

7 Claims, 5 Drawing Sheets

FISHING REEL WITH ADJUSTABLE DRAG FORCE CHARACTERISTICS

BACKGROUND OF THE INVENTION

1. Field of the Invention

This invention relates to a fishing reel having a drag mechanism whose drag is adjustable by a drag controller. More particularly, the invention relates to a technique of adjusting the degree of drag when the drag controller is operated to a predetermined position.

2. Description of the Related Art

A conventional technique as noted above is disclosed in Japanese Utility Model Publication No. 1988-29423. According to this technique, an initial pressure acting on a friction plate of a drag mechanism is adjusted by operating a dial type knob. In this way, the degree of drag occurring when a lever is operated to a predetermined position is adjustable by operating the knob.

When an attempt is made to catch a large fish with a thin fishing line, the drag must be adjusted with a high degree of precision. Further, where, as in a trolling reel, the drag mechanis is handled like a clutch mechanism in unwinding the fishing line from the spool, it is sometimes desired to switch by operating the controller between a state of applying drag and a state of unwinding the fishing line from the spool.

In the prior art noted above, however, the initial pressure acting on the friction plate of the drag mechanism is variable with operation of the knob. When the lever is operated, the pressure acting on the friction plate is variable at a constant rate of change. Thus, wherever the knob is set, it is difficult to adjust the drag with precision when the lever is operated a unit amount or to vary the drag to a large extent.

The following table shows an ideal range of drag adjustment in the trolling reel.

| line strength | drag strike position (⅓ of line strength) | maximum (½ of line strength) | difference |
|---|---|---|---|
| 36.3 kg (80 Lb) | 12 kg | 18 kg | 6.0 kg |
| 22.7 kg (50 Lb) | 7.5 kg | 11.4 kg | 3.9 kg |
| 13.5 kg (30 Lb) | 4.5 kg | 6.8 kg | 2.3 kg |

Where the three types of fishing lines 36.3 kg, 22.7 kg and 13.5 kg are used, the drag applied to the respective lines varies as shown in this table when the drag controller is operated from a strike position to a stroke end for increase. The differences resulting from the variations of the drag are 6 kg, 3.9 kg and 2.3 kg, respectively.

It will be seen from these examples that, with a drag mechanism as noted above which is constructed to vary only the initial pressure, drag is variable in a constant amount when the drag controller is operated a predetermined amount. It is therefore impossible to obtain an ideal drag suited to the strength of the fishing line.

SUMMARY OF THE INVENTION

The object of a the present invention is to provide an improved fishing reel capable of fine drag adjustment and a great degree of drag variations.

A fishing reel according to the present invention includes a drag mechanism adjustable by a drag controller, and a characteristics varying device for varying a drag increasing and decreasing rate relative to a unit operation of the drag controller.

Functions of the present invention will be described with reference to FIGS. 1 through 3. The characteristics varying device E includes an adjusting dial 24, a movable disk 25, and movable cams 27. An operation of the adjusting dial 4 results in variations in positions of contact of projections 25A of the movable disk 25 with the movable cams 27, thereby varying tilt angles of the movable cams 27. This varies an amount of change of drag relative to a unit operation of the drag controller.

When compared with a known drag mechanism, the drag variations resulting from adjustment by the characteristics varying device E of this invention are such that, as shown in the graph of FIG. 4(a), characteristics gradients representing the drag variations change relative to operating strokes of the controller. With the known drag mechanism, as shown in the graph of FIG. 4(b), gradients of characteristics resulting from operation of the knob do not change, and the graph shows only parallel displacements.

In FIGS. 4(a) and (b), the solid lines represent characteristics occurring with spinning reels, while the dotted lines represent those occurring with trolling reels.

According to the present invention, when a subtle adjustment of the drag is desired, the characteristics varying device is operated so that the gradient of characteristics describes a gentle curve (the movable cams 27 are tilted to a less degree). Then the drag is variable to a limited extent when the controller 21 is operated with a long stroke. When it is desired to vary the drag to a great extent with a short stroke of the controller 21, the characteristics varying device may simply be operated in the opposite direction.

Thus, the present invention provides an improved fishing reel capable of effecting a fine drag adjustment with an ordinary operation of the drag controller, and yet varying the drag to a great extent even with a short stroke operation of the drag controller.

Other features and advantages of the present invention will be apparent from the following description.

BRIEF DESCRIPTION OF THE DRAWINGS

The drawings show a fishing reel according to the present invention, in which.

DETAILED DESCRIPTION OF THE PREFERRED EMBODIMENTS

A fishing reel according to the present invention will be described in detail with reference to the drawings.

Figure 1:
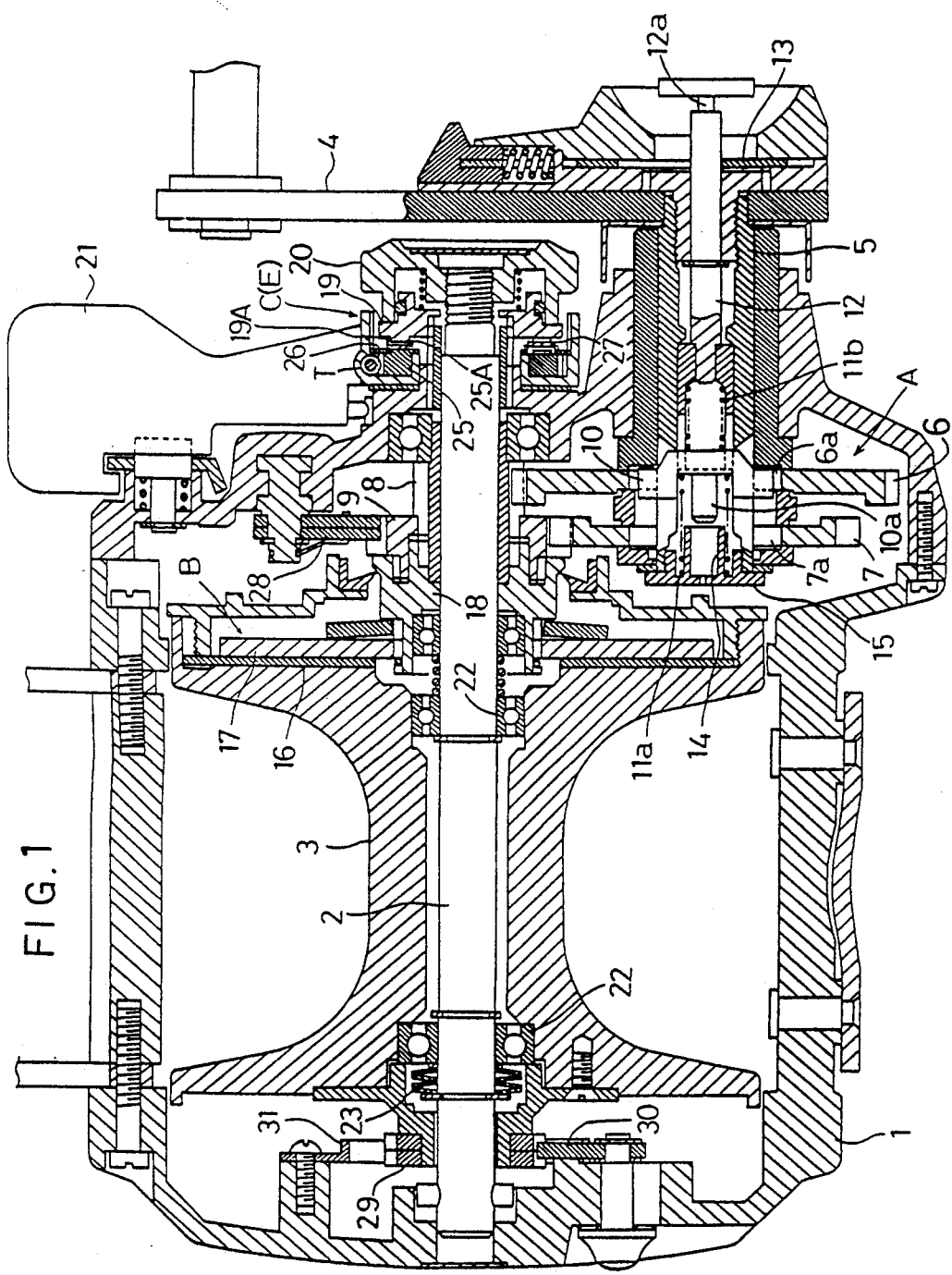
FIG. 1 is a view in vertical section of a bait casting reel.

As shown in FIG. 1, a baitcasting reel in this embodiment has a reel body 1 in which a support shaft 2 is disposed in a horizontal posture for supporting a spool 3 freely rotatable relative thereto for winding a fishing line. A line winding transmission system includes a sleeve shaft 5 connected to a handle, and a change speed gear mechanism A and a drag mechanism B for transmitting drive from the sleeve shaft 5 to the spool 3.

The change speed gear mechanism A includes a first gear 6 for high speed winding, a second gear 7 for low speed winding, a third gear 8 and a fourth gear 9 freely rotatably mounted on the support shaft 2 and meshed with the first and second gears 6 and 7, respectively, an engaging element 10 slidably mounted on the sleeve shaft 5 to be selectively engageable with engaging bores 6a and 7a of the first and second gears 6 and 7 to transmit the drive from the sleeve shaft 5 to one of the gears 6 and 7, two compression springs 11a and 11b for urging the engaging element 10, and a control shaft 12 for determining position of the engaging element 10. With this change speed gear mechanism A, when the control shaft 12 is drawn outwardly as shown in FIG. 1, the engaging element 10 engages the engaging bore 6a of the first gear 6 under the urging force of the inner compression spring 11a. When the control shaft 12 is pushed in, the inner compression spring 11a is compressed whereby the engaging element 10 engages the engaging bore 7a of the second gear 7 under the urging force of the outer compression spring 11b.

The control shaft 12 includes a groove 12a defined in an outer end position thereof, which is engageable with a slide type stopper 13 associated with the handle 4. The stopper 13 engages the groove 12a when the control shaft 12 is pushed in, to maintain the control shaft 12 in that position. When the engaging element 10 is out of phase with the engaging bore 7a of the second gear 7, the engaging element 10 is maintained in contact with a side face of the second gear 7. Subsequently, the compression spring 11b pushes the engaging element 10 into the engaging bore 7a when the engaging element 10 is moves into phase with the engaging bore 7a with turning of the handle 4.

The engaging element 10 of this change speed gear mechanism A includes a projection 10a extending inside and axially of the sleeve shaft 5 toward an inward end of the sleeve shaft 5. A tubular position retainer 14 is formed integral with a spring shoe screwed to the inward end of the sleeve shaft 5. The projection moves into sliding contact with the position retainer 14 when the engaging element 10 is driven toward the inward end of the sleeve shaft 5, to hold the engaging element 10 against tilting.

The drag mechanism B includes a friction plate 16 disposed on a side face of the spool 3, and a disk 17 for pressing on the friction plate 16. The disk 17 is mounted for unitary rotation on a transmission member 18 connected to the third and fourth gears 8 and 9. The frictional force of this drag mechanism B is adjusted as follows.

The support shaft 2 carries a turn knob 20 screwed to an end thereof adjacent the handle 4 for adjusting position of a pressure receiving element 19 disposed coaxially with the support shaft 2. A cam mechanism C is interposed between the pressure receiving element 19 and reel body 1. The cam mechanism C is operable by a lever-shaped drag controller 21. The spool 3 is freely rotatably mounted on the sleeve shaft 5 through bearings 22, and held in position by a belleville spring 23 against movement away from the handle 4.

Figure 2:
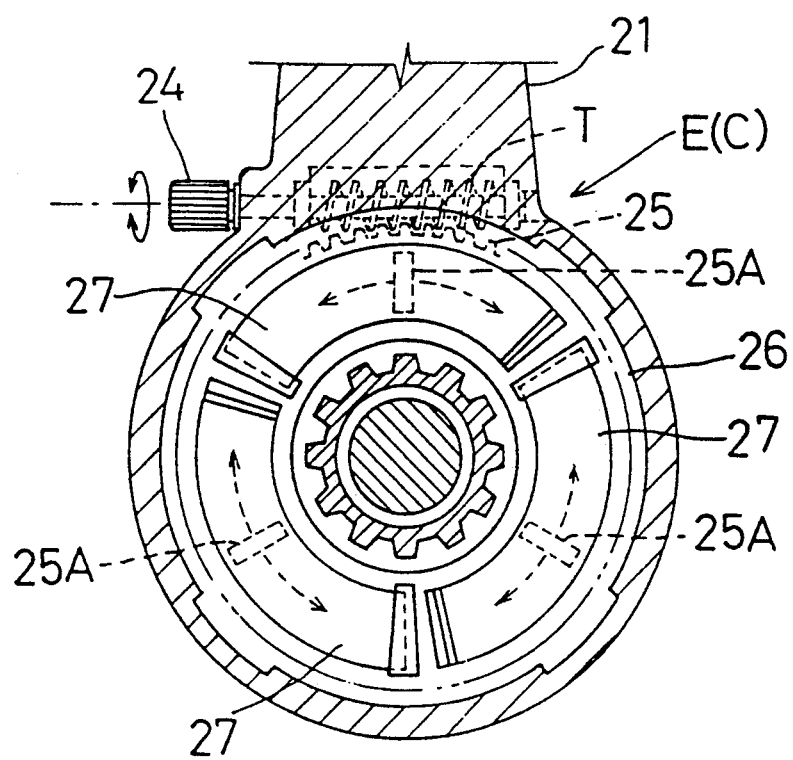
FIG. 2 is a view showing a configuration of a movable cam seen in a direction parallel to a spool axis.
Figure 3:
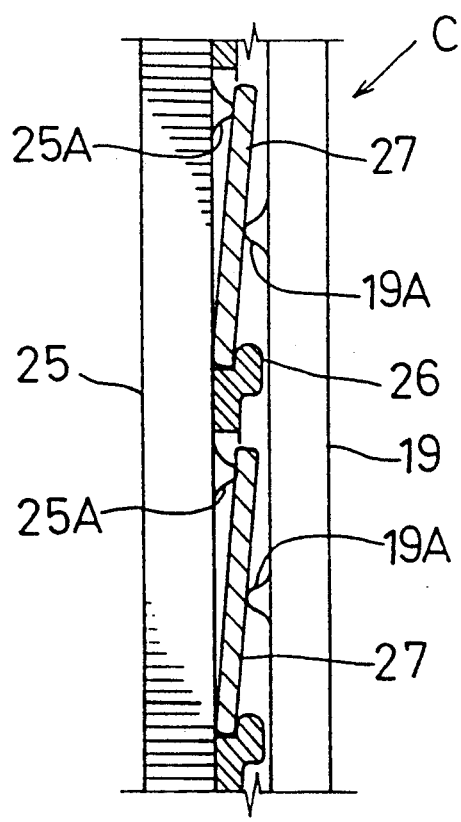
FIG. 3 is a developed view showing a movable cam control structure.
Figure 4:
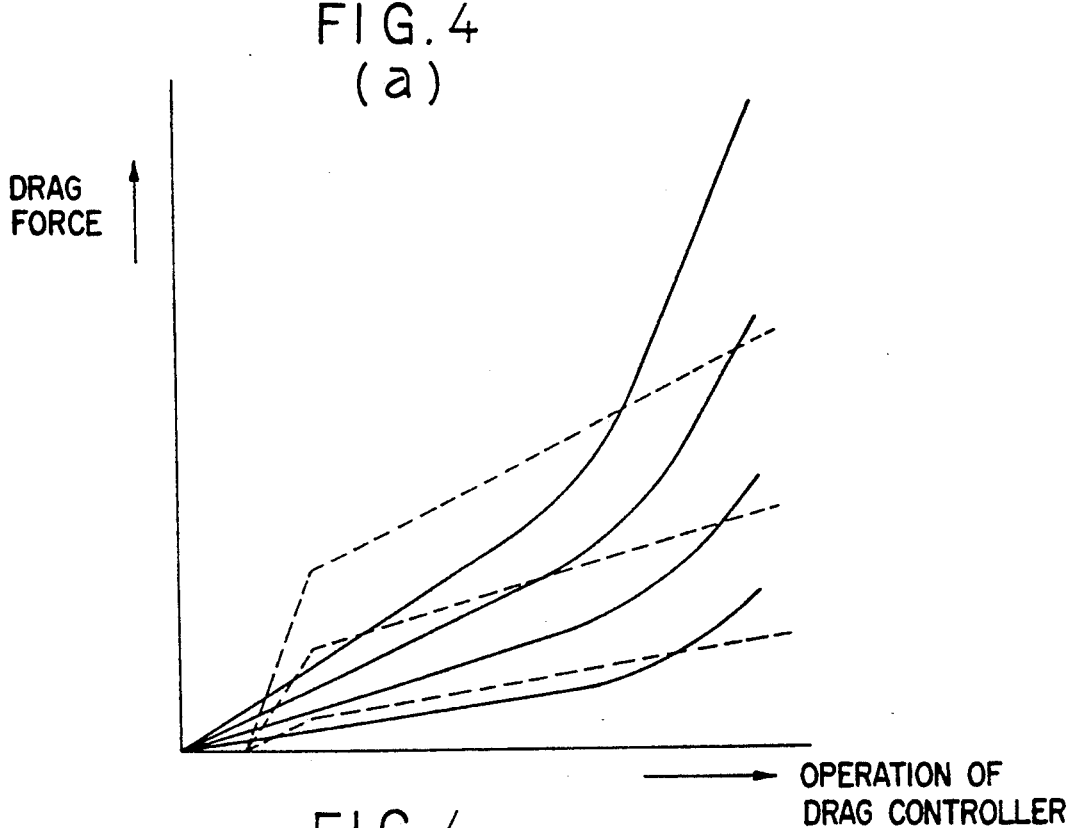
FIG. 4(a) is a graph showing drag variation characteristics of the reel according to the present invention.
FIG. 4(b) is a graph showing drag variation characteristics of a conventional reel.
Figure 4:
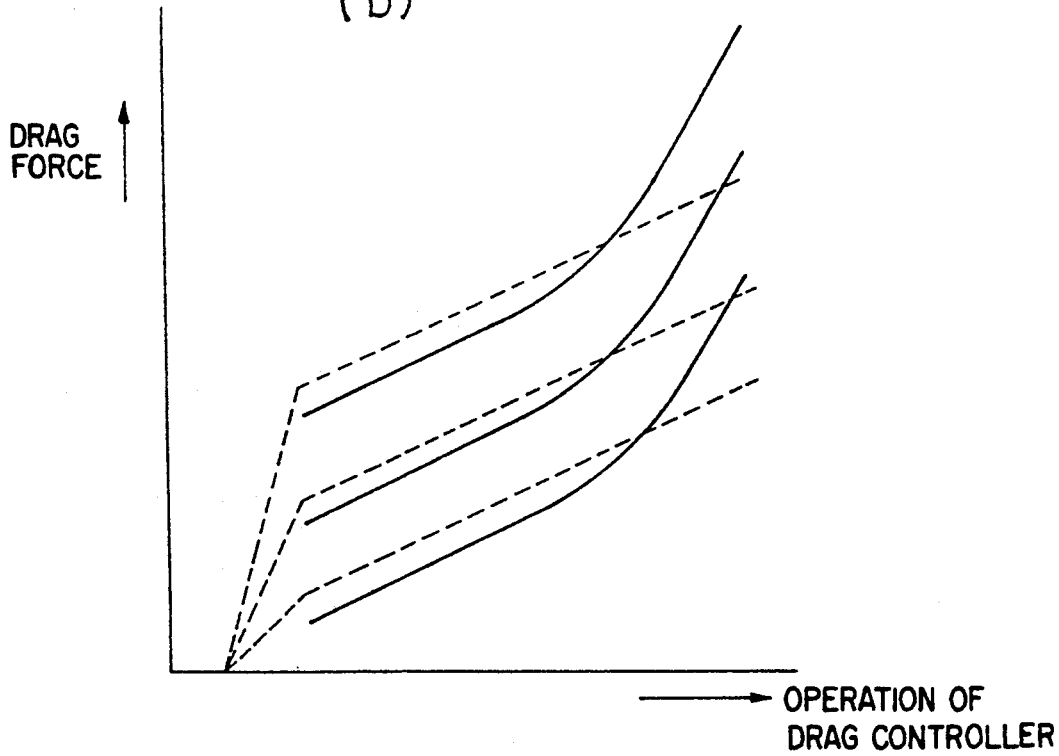

As shown in FIGS. 2 and 3, the cam mechanism C includes a movable disk 25 and a plurality of movable cams 27. The movable disk 25 is driven by a turning force of an adjusting dial 24 transmitted through a worm gear type transmission T. The movable cams 27 are tiltable to varied degrees as engaged and supported by a holder 26 as a result of variations in positions of contact with a plurality of projections 25A formed on the movable disk 25. The pressure receiving element 19 includes projections 19A contacting the movable cams 27.

The structure for adjusting tilts of the movable cams 27 is called a characteristics varying device E herein. This reel is constructed to adjust the drag in such a way that variation characteristics of drag may be selected by operating the adjusting dial 24, a rate of change of the drag resulting from a unit operation of the drag controller 21 may be selected by operating the turn knob 20 to oscillate the pressure receiving element 19.

When the drag controller 21 is operated to draw the support shaft 2 toward the handle 4, the spool 3 is moved toward the disk 17 thereby to increase the frictional force. Conversely, when the support shaft 2 is pushed in away from the handle 4, the frictional force of the drag mechanism B is decreased or eliminated to allow free rotation of the spool 3.

The fourth gear 9 is engageable by a ratchet pawl 28 to prevent backward rotation of the spool 3. Further, a clicking sound producing mechanism is provided at an end of the spool 3 remote from the handle 4. This mechanism includes a toothed wheel 29, a pawl 30 for engaging the toothed wheel 29, and a C-shaped spring 31 for connecting the pawl 30 to the reel body 1.

Figure 5:
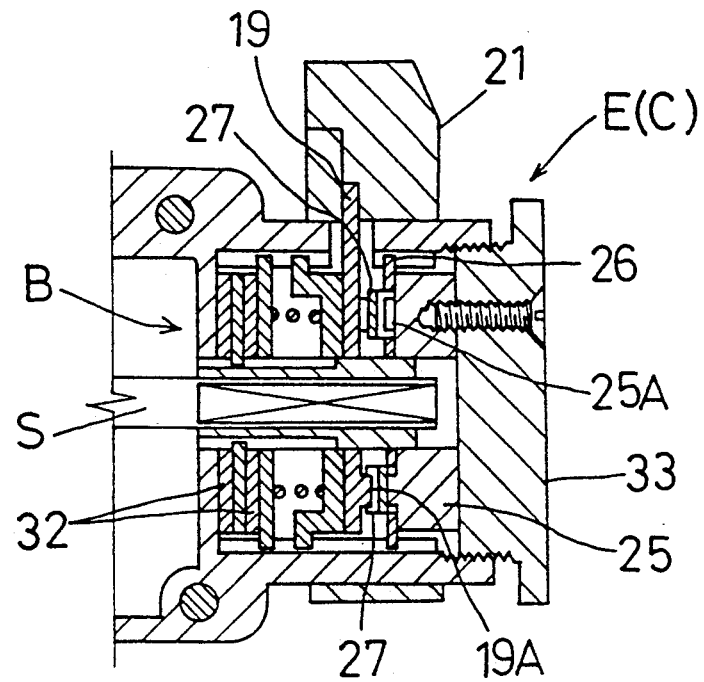
FIGS. 5 and 6 are sectional views of a structure according to the present invention as applied to a rear drag of a spinning reel.
Figure 6:
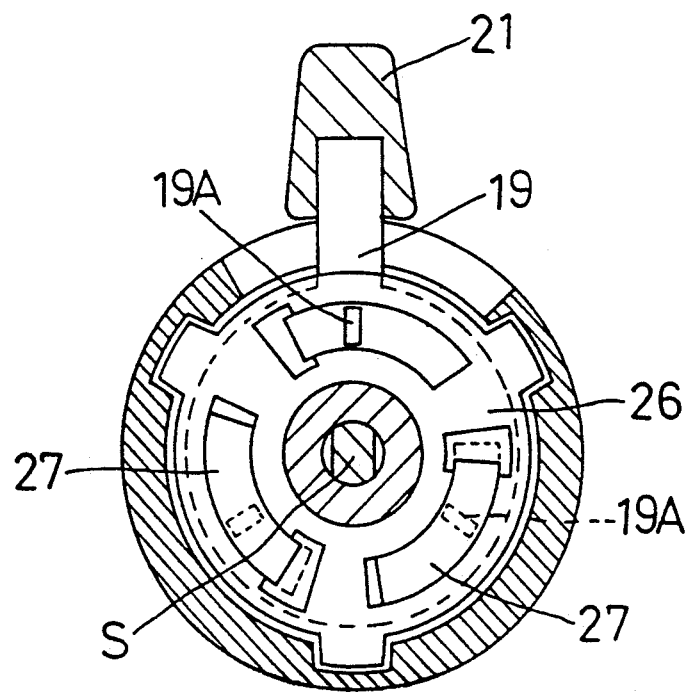
Figure 7:
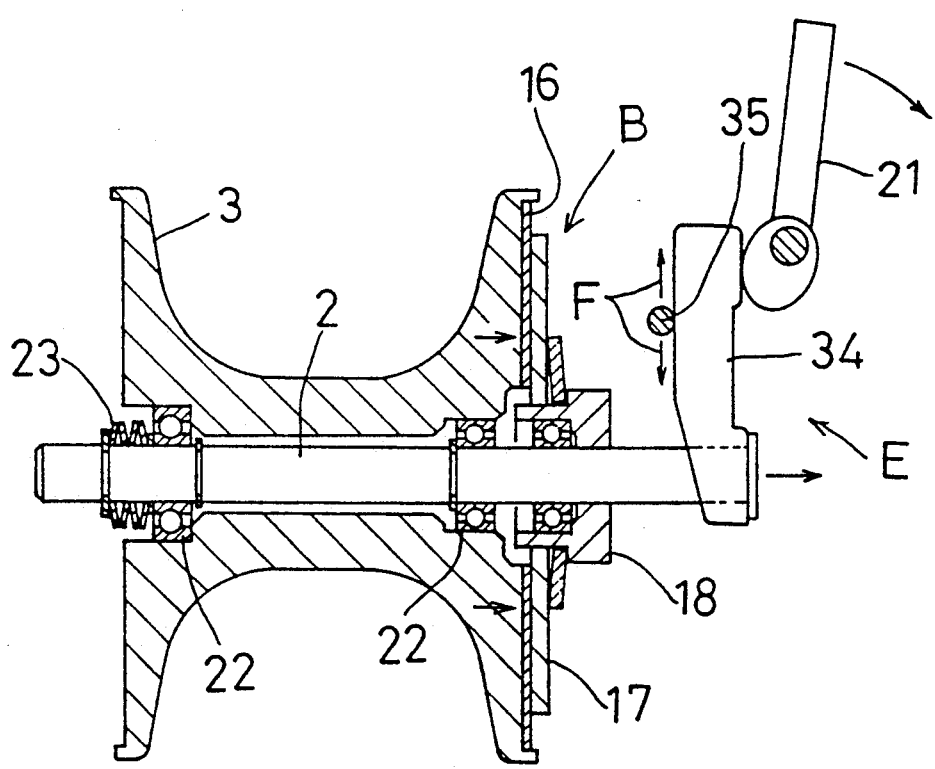
FIG. 7 is a schematic view showing a link mechanism acting as a characteristics varying device.

The present invention may be applied to a rear drag of a spinning reel as shown in FIGS. 5 and 6. This embodiment includes a movable disk 25 and movable cams 27 as in the foregoing embodiment. The drag mechanism B includes friction plates 32 pressed by a pressure receiving element 19. The movable disk 25 is turned by a disk-shaped dial 33. A braking force applied to a spool shaft S is adjustable by controlling the pressure receiving element 19 with a drag controller 21.

Further, the present invention may be worked as shown in FIG. 17. In this embodiment, the operating force of a drag controller 21 is transmitted to a drag mechanism B through a pivot type link mechanism 34. A characteristics varying device E is constituted by a pivot pin 35 acting as a pivotal point of the link mechanism 34 and positionally adjustable in directions of arrows F to vary arm ratios of the link mechanism 34.

Like reference numerals are used to identify like components in the embodiments described herein.

It is also in accordance with the present invention to provide a characteristics varying device E employing gears, whose change ratio is variable, in the load transmitting system between the drag controller and drag mechanism. Further, the present invention may provide a characteristics varying device E including an actuator such as an electric motor to adjust the drag of the drag mechanism, and a control mechanism to adjust an amount of operation of the actuator relative to an amount of operation of the drag controller.

It is also possible in accordance with the invention that the characteristics are variable only in the second half of an operating range of the drag controller.

What is claimed is:

1. A fishing reel comprising:
a reel body;
a spool for winding up a fishing line;
a handle;

a drive mechanism for winding a line on said spool in response to rotation of said handle;

a drag mechanism for applying a drag force against rotation of said spool, said drag mechanism including a movable drag controller for varying the amount of drag force applied by said drag mechanism to said spool; and a drag force characteristics varying means, said drag force characteristics varying means being adjustable to increase and decrease an amount of variance of a drag force which is applied for a given unit of movement operation of said drag controller; and wherein said characteristics varying means includes a movable disk driven by a turning force of an adjusting dial transmitted through a transmission, said adjusting dial being operable to select drag variation characteristics, and a plurality of movable cams tiltable to varied degrees as engaged and supported by a holder as a result of variations in positions of contact with a plurality of projections formed on said movable disk, whereby said characteristics varying means is operable to adjust tilting amounts of said movable cams.

2. A fishing reel as claimed in claim 1, wherein said drive mechanism includes a change speed gear mechanism for changing the speed of at least a portion of said drive mechanism.

3. A fishing reel as claimed in claim 2, wherein said change speed gear mechanism includes a first gear for high speed winding, a second gear for low speed winding, and a third gear and a fourth gear meshed with said first gear and said second gear, respectively, and freely rotatably mounted on a support shaft supporting a spool.

4. A fishing reel as claimed in claim 3, wherein said drag mechanism includes a friction plate disposed on a side face of a spool, and a disk for pressing on said friction plate.

5. A fishing reel as claimed in claim 4, wherein said disk is mounted for unitary rotation on a transmission member connected to said third and fourth gears.

6. A fishing reel as claimed in claim 1, wherein said drag mechanism includes a friction plate disposed on a side face of said spool, and a disk for pressing on said friction plate.

7. A fishing reel as claimed in claim 1, wherein said transmission includes a worm gear element.

* * * * *